(12) United States Patent
Harmeling

(10) Patent No.: US 6,443,495 B1
(45) Date of Patent: Sep. 3, 2002

(54) MULTIPLE LEVEL FLOOR FLANGE APPARATUS AND ASSOCIATED METHOD

(75) Inventor: John M. Harmeling, Walton, KY (US)

(73) Assignee: Jet Plumbing Products, Inc., Covington, KY (US)

( * ) Notice: Subject to any disclaimer, the term of this patent is extended or adjusted under 35 U.S.C. 154(b) by 0 days.

(21) Appl. No.: 09/918,340

(22) Filed: Jul. 30, 2001

(51) Int. Cl.⁷ .............................. F16L 55/00; E03D 11/00
(52) U.S. Cl. ............................ 285/56; 285/3; 285/4; 285/57; 285/58; 4/252.1; 4/252.4; 4/DIG. 7
(58) Field of Search ............................ 285/56, 57, 58, 285/3, 4; 4/252.1, 252.2, DIG. 7

(56) References Cited

U.S. PATENT DOCUMENTS

| | | | |
|---|---|---|---|
| 1,497,171 A | * 6/1924 | Haas ........................... | 4/252.2 |
| 2,282,641 A | 5/1942 | Corey | |
| 3,775,780 A | 12/1973 | McEwen ..................... | 4/252 R |
| 3,896,510 A | 7/1975 | O'Connell .................. | 4/252 R |
| 3,921,661 A | 11/1975 | Emberson ................... | 137/536 |
| 4,014,053 A | * 3/1977 | Jones .......................... | 4/252.2 |
| 4,233,697 A | * 11/1980 | Cornwell ...................... | 4/293 |
| 4,384,910 A | 5/1983 | Prodyma ..................... | 156/92 |
| 4,515,398 A | 5/1985 | Machon, Sr. ................ | 285/59 |
| 4,757,560 A | * 7/1988 | Grimstad ........................ | 4/417 |
| 4,827,539 A | 5/1989 | Kiziah .......................... | 4/252 R |
| 4,984,308 A | * 1/1991 | Handal ........................... | 4/252.2 |
| 5,297,817 A | * 3/1994 | Hodges ........................ | 285/15 |
| 5,421,036 A | 6/1995 | Stevens et al. .............. | 4/252.1 |
| 5,432,957 A | 7/1995 | Fernie et al. ................ | 4/252.4 |
| 6,065,160 A | 5/2000 | Winn .......................... | 4/252.1 |
| 6,094,752 A | 8/2000 | Loshaw ...................... | 4/252.1 |

* cited by examiner

Primary Examiner—Kathy Matecki
Assistant Examiner—Carlos Lugo
(74) Attorney, Agent, or Firm—Wood, Herron & Evans, L.L.C.

(57) ABSTRACT

A floor flange apparatus for use with a plumbing fixture positioned on a floor surface includes a conduit section having a fixture end and a drain end and defining a bore therethrough. The conduit section is adapted to be coupled to a drain pipe proximate the drain end and to be coupled to a plumbing fixture proximate the fixture end for draining water from the plumbing fixture. A flange is positioned proximate the fixture end of the conduit, and the flange is configured to engage a plumbing fixture and couple the fixture to the conduit section. Elevation structures extend from the flange and are configured for interfacing with a floor surface to elevate the flange above the floor surface. At least a portion of the elevation structures are removably coupled with the flange for being selectively removed to allow the elevation of the flange to be selected.

32 Claims, 2 Drawing Sheets

MULTIPLE LEVEL FLOOR FLANGE APPARATUS AND ASSOCIATED METHOD

FIELD OF THE INVENTION

This invention is directed to plumbing in general, and specifically to an improved floor flange for use with plumbing fixtures, such as toilets.

BACKGROUND OF THE INVENTION

In the installation of plumbing fixtures, such as toilets, urinals, bathtubs, or the like, the fixture is placed on the finished floor surface proximate to the rough plumbing and is then coupled to the rough plumbing, such as a drain pipe. To complete such an installation, a mounting flange structure, often referred to as a floor flange or closet flange, is utilized. A conduit portion of the flange structure is first coupled with the drain line and then the plumbing fixture is placed over a flange portion of that structure. The discharge outlet of the plumbing fixture is sealingly engaged with the flange portion by a wax ring or other such water-tight, flexible gasket. The fixture and the mounting flange structure are then rigidly bolted together.

Depending on the particular installation, the finished floor surface on which the flange and plumbing fixture will rest, may vary. Oftentimes, a sub-floor will be constructed, such as from plywood, and the rough plumbing and flange will be installed with the sub-floor in place. However, a finished floor material, such as one of decorative hardwood, ceramic tile, or a concrete material (e.g. gypcrete) may be subsequently installed over the sub-floor. Since the plumbing fixture will rest on the finished floor material, the flange must rest generally above the sub-floor and on the finished floor surface to sealingly engage the outlet of the fixture. While the mounting flange structure is installed when the sub-floor is in place, the installation of the mounting flange structure must be made with the finished floor in mind. Therefore, the mounting flange structure is installed with the flange portion actually spaced above the sub-floor at a height which is sufficient to accommodate the thickness of the floor material to be placed above the sub-floor (e.g., hardwood, tile, gypcrete).

Traditionally, plumbers have usually propped a piece of scrap wood or a short section of pipe of the appropriate and desired length and/or thickness, underneath the flange portion. The conduit portion of the mounting flange structure is then sealed with the drain pipe and the flange portion is affixed to the sub-floor, such as with screws. The wood, pipe, or other objects for propping up the flange have to be measured and cut to the right height/thickness to accomplish the desired height of the flange portion for the thickness of the finished floor material. The pieces must also be cut to the proper lengths to provide a level flange. As may be appreciated, this practice significantly slows down the installation. Furthermore, scrap pieces of pipe or wood might not be readily available. Still further, the exercise of finding such scrap items and measuring and cutting them to the proper height must be done for each flange structure if it is to be mounted above the sub-floor.

Attempts have been made in the prior art to allow for adjusting the height of a mounting flange structure for different installations, as evidenced by U.S. patents in the field. However, such devices have multiple pieces which must be installed and coupled together. Not only do the extra pieces and parts increase the cost of manufacturing and installing the devices, but they also require extra installation steps and adjustments which slow down the overall procedure.

Additionally, to suitably improve current procedures for installing mounting flange structures, any improvements should be relatively simple to implement, so that plumbers without significant experience may readily implement them.

Accordingly, it is an objective to improve the process of installing plumbing fixtures, and particularly to improve the installation procedures associated with a floor flange.

It is a further objective to address various installation parameters efficiently and cost effectively in the installation of plumbing fixtures.

It is still another objective to improve such an installation process with a product which is easy to use and which has few separate parts.

SUMMARY OF THE INVENTION

An apparatus for use in mounting a plumbing fixture comprises a conduit section having a fixture end and a drain end and defining a bore therethrough. A flange is positioned proximate the fixture end of the conduit. The conduit section is adapted to be coupled to a drain pipe proximate the drain end, and to be coupled to a plumbing fixture proximate the fixture end. For varying the height or level of the flange, at least one elevation structure extends from the flange, and is configured for interfacing with the floor surface to elevate the flange above the floor surface at a selected height or level. The elevation structure is adjustable, and in one embodiment, at least a portion of the elevation structure is removably coupled with the flange for being selectively removed to allow the flange to be lowered closer to the sub-floor surface.

More specifically, for one embodiment, the elevation structure is in the form of an elongated leg having several sections. One or more of the sections may be removed from the leg to vary the height of the flange, or alternatively, the entire elongated leg may be removed from the flange for flush mounting of the flange against the floor surface. The various sections may have predetermined lengths such that the height of the flange may be varied in predetermined stages without requiring a measurement. Multiple elongated legs provide self-leveling of the flange.

In another embodiment of the invention, the apparatus includes a base section configured for engaging a floor surface around and below a conventional floor flange. Elevation structures extend upwardly from the base section, and are configured for interfacing with the flange to elevate the flange at selected heights above the sub-floor surface. Similar to the elevation structures of the embodiment previously discussed, in one embodiment, the elevation structures are in the form of elongated legs having multiple sections which may be selectively and individually separated to vary the height or level of the flange. For a flush mounted flange against the sub-floor, the apparatus simply is not used.

In accordance with another aspect of the present invention, the apparatus includes a removable cover extending over the fixture end of the conduit section to seal the conduit and prevent debris from falling therein. The cover includes tabs thereon configured to prevent debris from entering the slots. The cover may include graphics and text and is operable for being removed when the plumbing fixture is to be coupled to the apparatus.

BRIEF DESCRIPTION OF THE DRAWINGS

The accompanying drawings, which are incorporated in and constitute a part of this specification, illustrate embodiments of the invention and, together with a general descrip

DETAILED DESCRIPTION OF EMBODIMENTS OF THE INVENTION

Figure 1:
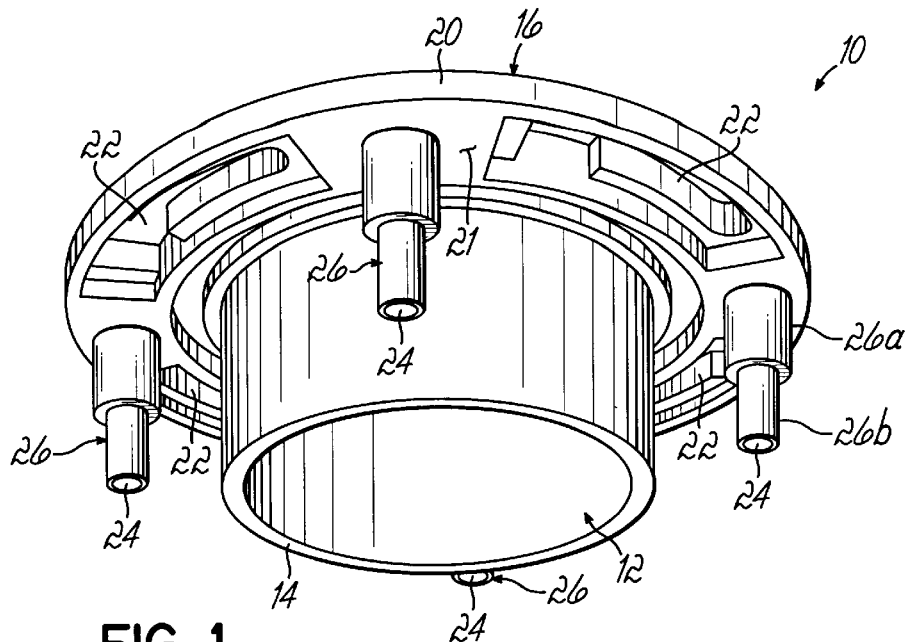
- FIG. 1 is a perspective view of one embodiment of the invention.

Referring to FIG. 1, a perspective view of one embodiment of a floor flange apparatus, in accordance with the principles of the present invention, is illustrated. Such a floor flange is to be utilized with a plumbing fixture, such as a toilet or water closet, which is to be positioned on a floor surface, such as in a lavatory or restroom. The floor flange apparatus 10 may be used with any suitable plumbing fixture. Apparatus 10 comprises a body with various different components or sections. Generally, it will be desirable for the sections to be integrally formed together so that the apparatus 10 may be manufactured, sold, manipulated and installed as a single piece. For example, the entire apparatus 10 might be integrally molded of PVC or ABS. Alternatively, in other embodiments of the invention, the multiple components of the invention might be formed separately and coupled together for installation. Furthermore, in accordance with one specific alternative embodiment of the invention, as discussed further hereinbelow, the inventive system utilizes an apparatus which is used in conjunction with a conventional floor flange. The floor flange apparatus of the invention is also often referred to as a mounting flange, a closet flange, water closet coupling, or soil pipe flange, as well as various other names.

Apparatus 10 comprises a conduit section 12 which resembles typical PVC conduit utilized for plumbing pipes. Generally, in accordance with prior art flange structures, the conduit section 12 will be cylindrical in shape, having a circular cross-section, and may be dimensioned to couple with conventional plumbing. For example, the conduit section 12 may fit inside of a four-inch drain pipe or waste pipe 30, or outside of a three-inch drain pipe or waste pipe. Therefore, the conduit section 12 will generally interface with the drain pipe 30 at or under the sub floor surface 34, as illustrated further in FIG. 3. To that end, the conduit section 12 has a drain end 14 and a fixture end 16. The conduit section 12 defines a bore therethrough such that when the drain end 14 is coupled to a waste pipe or drain pipe 30, the conduit acts as an extension of the pipe up to the plumbing fixture 44. The fixture end 16 of the conduit section 12 is coupled to an outlet of the plumbing fixture, as discussed herein, for draining water, waste, and other materials from the plumbing fixture.

Proximate the fixture end 16 of the conduit, a flange 20 is positioned. The flange 20 forms a ring around the fixture end 16 of the conduit section, and suitable dimensions to be used like a conventional floor flange, as will be understood by a person of ordinary skill in the art. Of course, the size of the conduit section 12 and the size of the flange may take any suitable dimension as is necessary for installing a plumbing fixture and coupling it to a drain pipe. In a preferred embodiment, and as with conventional floor flanges, the conduit section 12 is integrally molded with the flange 20. The flange includes one or more key slots 22 formed therein. As is known to a person of ordinary skill in the art, the key slots are used to bolt a plumbing fixture, such as a toilet, to the flange once it has been installed on the floor. Flange 20 also includes bores 24 which extend through the flange 20, and particularly extend through respective elevation structures 26, as discussed below. The bores 24 allow fasteners, such as screws 48, to be inserted through the flange and into a the sub floor 32 to which the floor flange apparatus 10 is to be mounted (see FIG. 3).

In accordance with the principles of the present invention, in order to utilize the floor flange apparatus 10 readily and easily within an installation which will require another floor or material, such as hardwood, tile, or gypcrete above a sub-floor 32, such as a plywood sub-floor, elevation structures 26 are utilized and extend downwardly from the flange. The embodiment of apparatus 10 illustrated in the figures utilizes four elevation structures 26. However, a lesser number might also be utilized. The elevation structures 26 are configured for interfacing with the sub-floor surface 34 when the floor flange apparatus 10 is being installed. The structures 26 elevate the flange 20 of the apparatus 10 to a level above the sub floor surface 34. In that way, the finished floor material 40 may be installed between the sub-floor 32 and the bottom surface 21 of the flange, leaving the flange 20 generally resting on the top of the finished floor 40 or "flush" with the floor 40.

In accordance with one aspect of the present invention, at least a portion of each elevation structure 26 is removably coupled with the flange 20 for being selectively removed to allow the level or elevation of the flange 20 to be selected. The flange may be lowered closer to the sub-floor surface 32, or may be placed directly on the sub-floor surface 32, as desired. This allows for great adaptability in the installation process for installing plumbing fixtures, and eliminates the need for separate support structures to be used with apparatus 10.

Figure 2:
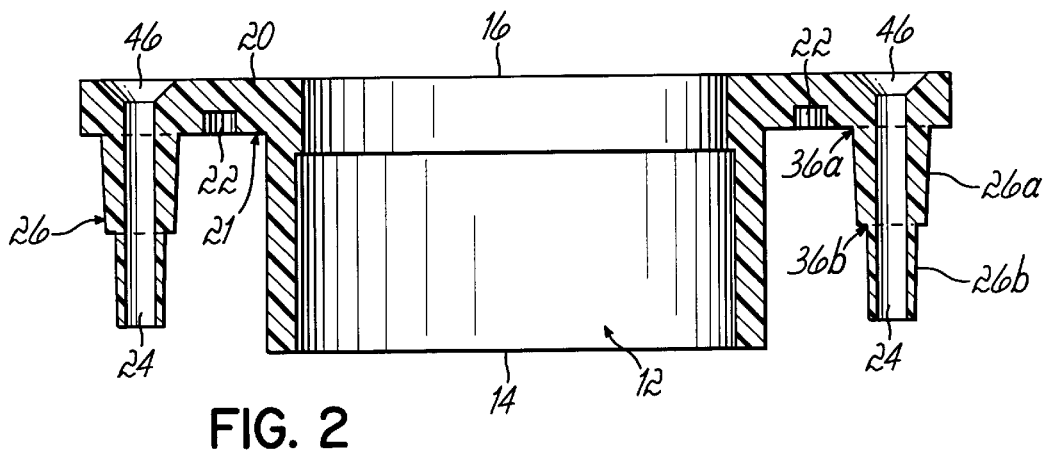
FIG. 2 is a side cross-sectional view of the embodiment illustrated in FIG. 1.
Figure 3:
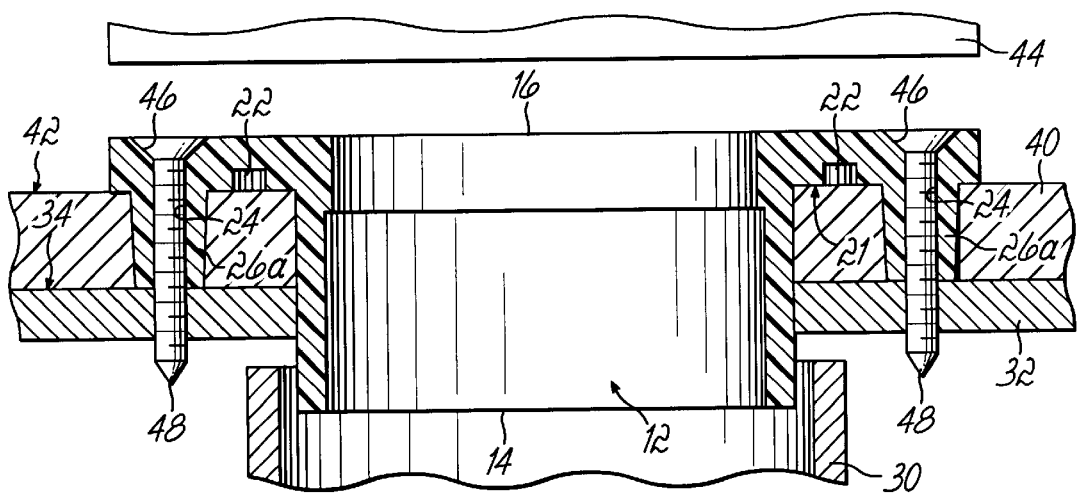
FIG. 3 is a side cross-sectional view, as in FIG. 2, showing the apparatus installed within a floor.

Referring to FIGS. 2 and 3, when the floor flange apparatus 10 of the invention is to be utilized, generally the drain pipe 30, or other pipe, is in position and the rough plumbing has been completed with respect to a sub-floor 32 of the premises. The sub-floor 32 will often be of plywood material, although it might also be concrete. The drain end 14 of conduit section 12 is positioned with the drain pipe 30 in the sub-floor 32, generally either inside or outside of the drain pipe. Flange 20 of apparatus 10 is positioned above the top of the sub floor surface 34 of the sub-floor 32. To hold the flange 20 and the fixture end 16 of the conduit section 12 at a desired height or level above the sub floor surface 34, the elevation structures 26 interface with the top of the sub floor surface 34 of sub-floor 32, such as by resting thereon, and maintain the proper height or level of the flange 20 with respect to the subsequent installation of the finished floor 40. The elevation structures 26 also act to properly level the flange in position.

In the use of the invention, each installation will have its own parameters. The present invention and its multiple level features adapt to the parameters of multiple installation scenarios, in accordance with the principles of the present invention. To that end, portions of the elevation structures 26 are removably coupled with the flange 20. In the embodiment illustrated in the drawings, the elevation structures 26 comprise a plurality of cooperating sections, such as sections 26a and 26b. At least one of the sections is removable from the other sections for selectively varying the height or level at which the flange is elevated from sub floor surface 34.

In one embodiment, the elevation structures 26 are in the form of elongated legs as illustrated in the figures. The sections 26a and 26b of each elevation structure 26 are defined by a plurality of break points 36a, 36b. The break points are operable for allowing one section to be selectively broken from another section or from flange 20 to vary the length of the elevation structure 26 and thereby vary the height or level of flange 20 above sub floor surface 34. The break points 36a, 36b may be formed by suitable structural weakening of the elevation structure at those break points. For example, serrations might be utilized around the elevation structure 26 at the break points 36a, 36b. Alternatively, a thinner wall might be utilized at those break points. In the embodiment illustrated in the figures, the elongated legs forming the elevation structures 26 are generally cylindrical, in the shape of a tapered cylinder. One section of the elevation structure, designated as 26b, has a smaller outer diameter than the diameter of the other section 26a. The different diameters and dimensions demarcate the break points in the elevation structure 26. Alternatively, the sections 26a, 26b might share generally the same diameter.

The bore 24 passes through the sections of the elevation structure, and is generally centered therein. To make a break point, for example, the wall between the outer surface of the elevation structure and the bore 24 may be thin or weak to allow the multiple sections of the elevation structure to be broken at the break points. Break point 36a is provided to allow the elevation structures to be removed completely from the flange, to allow the flange to be positioned generally right on top or flush with sub floor surface 34, if desired.

In one installation, the height of the flange 20 above the sub-floor 32, and specifically the height of the bottom surface 21 of the flange above sub floor surface 34, may be a predetermined distance.

For example, in some installations, a distance of 1.5 inches might be required. To that end, and in accordance with another aspect of the present invention, the multiple sections 26a, 26b of the elevation structure 26 are dimensioned at predetermined lengths for elevating the flange 20 at a number of predetermined heights above the sub floor surface 34. For example, a height of 1.5 inches might be required, as noted above. To that end, in accordance with one embodiment of the invention, the elevation structure may be configured and dimensioned to elevate the flange 20 above the sub-floor surface 34 by approximately 1.5 inches. Therefore, the length of the elevation structure 26 will be approximately 1.5 inches from surface 21 to the bottom of the flange. In other installations, a spacing of only approximately ¾ inches (0.75 inches) might be necessary. To that end, break point 36b is positioned on the elevation structure 26 approximately midway down the length of the structure. In that way, section 26b may be broken or otherwise removed from the apparatus 10 to allow the flange 20 to be lowered closer to the sub-floor surface as desired. In that regard, the section 26a is approximately 0.75 inches long and section 26b is approximately the same length, so that the two sections, 26a and 26b together provide a 1.5 inch spacing. Other dimensions for the length of the elevation structures might also be utilized.

As will be understood by a person of ordinary skill in the art, the dimensions of the elevation structures 26, and particularly of the individual sections 26a, 26b may be varied to address different installation parameters. The 1.5 inch elevation structures and the 0.75 inch sections are illustrated here and address some current typical installation scenarios. Furthermore, the elevation structures might be cut or shortened by physically trimming the structures at different points than the break points.

Referring to FIG. 3, the invention is shown installed in a floor surface requiring a 0.75 inch spacing from the sub floor surface 34. To that end, sections 26b have been removed so that sections 26a remain to elevate the flange 20 above the sub-floor 32 and specifically above sub floor surface 34. Subsequently, the finished floor 40, which may be hardwood, tile, gypcrete, or any other suitable material, is installed. The elevated flange remains at a proper level with respect to the upper surface 42 of the finished floor 40. The outlet end of plumbing fixture 44, such as a toilet, may then be installed on the flange 20 in a conventional manner. Usually, a wax ring seal will be utilized around the top of the flange 20 to provide a seal between the flange 20 and conduit section end 16 and an interface surface (not shown) of the plumbing fixture 44 for a liquid-tight seal. The drain end 14 of the conduit section 12 has been earlier sealed with the drain pipe 30, such as by a suitable PVC sealant. When installing the apparatus 10 of the invention in place on the sub-floor 32, fasteners 48, such as screws or bolts, pass through the flange 20 and through bores 24 in the elevation structures 26 to anchor in the sub floor 32. As illustrated in FIG. 2, the section of the bore 24 proximate the flange 20 has a flared, recessed section 46 for receiving the head of fastener 48 so that it is flush with the top surface of the flange 20.

In one preferred embodiment, the elevation structures 26 are in the form of elongated legs which extend essentially perpendicular to the plane of flange 20. In that way, maximum elevation may be achieved with a minimal amount of material. Alternatively, the elevation structures in the form of elongated legs might be angled from flange 20 other than perpendicularly.

In another installation scenario, it may be desirable to use the entire structure 26 for 1.5 inches of elevation, or it may not be desirable to have any elevation of the flange 20 above the sub-floor 32. For example, in a poured concrete sub-floor 32, a finished floor may not be utilized so that the plumbing fixture may be mounted directly on the sub-floor. To that end, the rough plumbing 30 would be accessible at the surface 34 of the sub-floor and no elevation would be necessary for flange 20. In accordance with the principles of the invention, break point 36a may be utilized to separate the entire length of the elevation structure 26 from flange 20 so that the elevation structure may be completely removed from the flange 20 to allow the flange to be positioned generally flush upon sub-floor surface 34. The invention would then be installed like a conventional floor flange. Therefore, the present invention provides its inventive features while still allowing use of the apparatus 10 in an installation requiring no elevation above a sub-floor.

The present invention provides a quick and easy installation and eliminates the need of the plumber having to find scrap material to be precisely measured and cut. The invention is self-leveling and is readily adaptable to numerous different installation scenarios. While the Figures illustrate one embodiment using four elevation structures in the shape of elongated legs, and positioned at approximately 90° intervals around a round flange, a greater or lesser number of such structures and/or different spacing on flange 20 may be utilized and the structures 26 may have different shapes than the elongated legs shown. The purpose of the invention is to provide selective elevation of the flange above a floor surface at different levels, and the aspects of the present invention may be practiced in other embodiments, according to the principles set forth herein.

While one preferred embodiment utilizes elongated structures integrally molded with the flange, other elongated structures might be fastened to the flange. For example, bores might be formed in the flange to receive the elevation structures which are press fit thereon. Alternatively, the structures 26 may be threaded and may screw into threaded bores in the flange. This may allow a conventional floor flange to be retrofit to practice the present invention.

Figure 4:
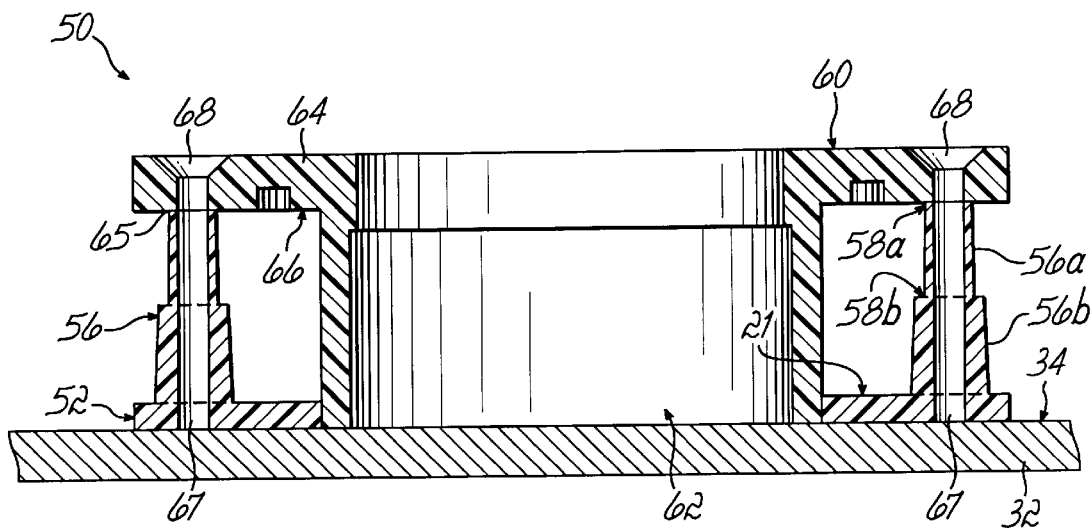
FIG. 4 illustrates an alternative embodiment of the invention.

FIG. 4 illustrates an alternative embodiment of the invention, and specifically shows an apparatus wherein the elevation structures do not extend, or depend downwardly from the flange to interface with the floor surface. Rather, as illustrated in FIG. 4, the apparatus 50 includes a base section 52 which is configured for engaging the sub floor surface 34 of the floor or sub-floor 32. One or more elevation structures 56 extends above the base section 52, and the elevation structures of apparatus 50 are configured for interfacing with a traditional floor flange structure 60, including a conduit section 62 and flange 64. For example, the upper ends 65 of the elevation structures 56 may contact the lower surface 66 of the flange 64 to raise or elevate the flange 64 above the base section 52 and above a sub floor surface 34. As discussed hereinabove with respect to the embodiment of the invention illustrated in FIGS. 1–3, the elevation structure may comprise a plurality of sections wherein at least one of the sections is removable from the other of the sections for selectively varying the height at which the flange is elevated above the sub floor surface 34. In one embodiment, the elevation structures 56 may be in the form of elongated legs having a plurality of sections 56a, 56b defined by break points 58a, 58b. In that way, the height of the flange 64 may be adjusted. Alternatively, if no elevation is required above the sub floor surface 34, the apparatus 50 would not be utilized at all, and the floor flange would be installed in a conventional manner. Since the base section has a finite thickness, it will provide some elevation to the elevation structures 56. Therefore, the height of the structures 56 and their dimensions would take into account the thickness of base section 52. The structures 56 will also have bores 67 therein which align with fastener bores 68 formed in flange 64.

Figure 5:
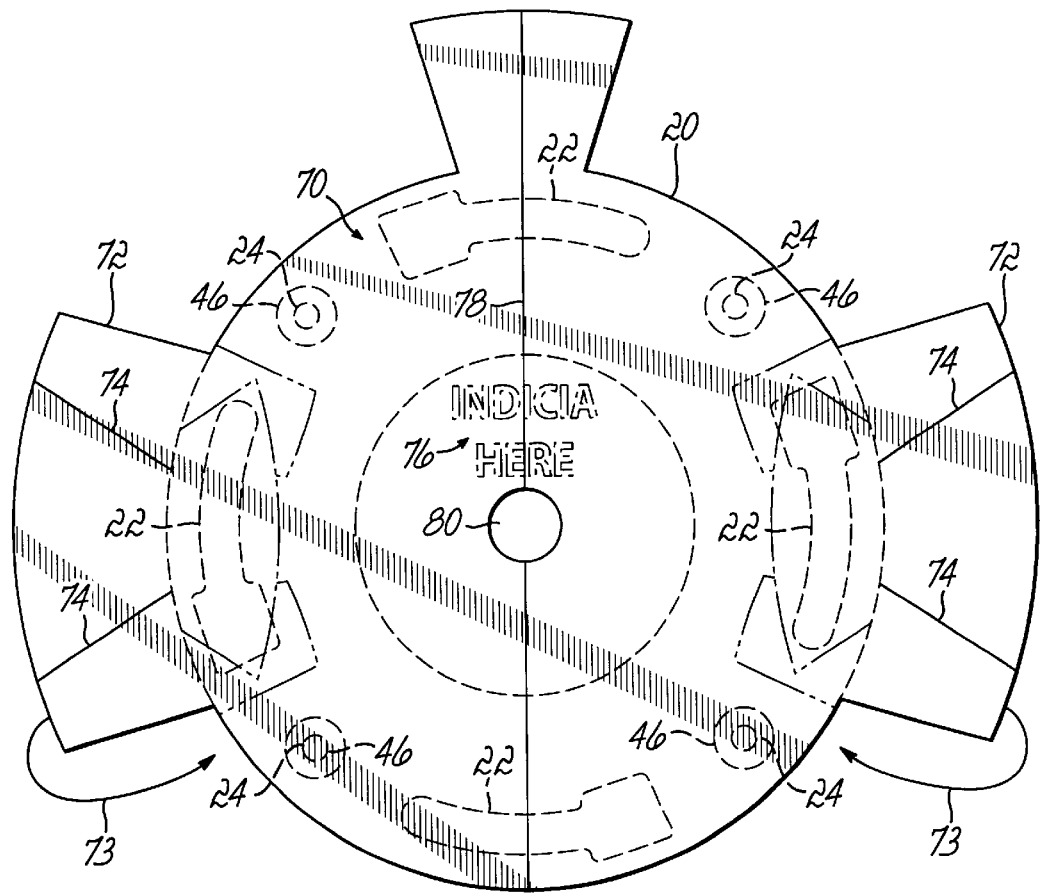
FIG. 5 illustrates a removable cover in accordance with one aspect of the present invention.

FIG. 5 illustrates another aspect of the present invention. Specifically, the apparatus 10 may optionally include a removable cover 70 which is positioned over the flange 20 on the side opposite the conduit section. FIG. 5 illustrates a top view of apparatus 10 with a cover 70 in place. Cover 70 covers the fixture end 16 of the conduit section 12 and prevents debris from falling therein when the apparatus is coupled to the plumbing in the floor. The cover 70 is operable for being removed when a plumbing fixture is then subsequently coupled to the apparatus to allow proper drainage from the plumbing fixture. More specifically, cover 70 may be a peelable cover attached with a pressure-sensitive adhesive to the surface of the flange. The cover prevents debris, such as gypcrete, from adhering to the top of the flange. The embodiment of the invention might include a removable piece which covers the fixture end of the conduit section, as is known to persons of ordinary skill in the art. The removable piece will be taken out for final installation of the fixture to the flange. Furthermore, cover 70 extends over at least one of the key slots 22 in the flange 20, and prevents gypcrete and other debris from clogging those slots, as well, when the gypcrete is poured for the floor.

In accordance with another aspect of the cover 70, it includes one or more tabs 72 which are positioned to be folded over in the direction of arrows 73 to cover the key slots 22 on the underside of the flange 20. In that way, the key slots are completely protected on both sides from materials blocking them which may interfere with coupling of a plumbing fixture to the flange 20. For example, the tabs 72 prevent wet gypcrete from seeping up under the flange and into the slots from the bottom surface 21 of the flange.

In the embodiment illustrated in FIG. 5, only two tabs 72 are shown to illustrate their function in covering the underside of the slots 22. If four slots 22 are used in the flange, four tabs 72 might be desirable. The top side of the slots 72 are protected by the main body of cover 70, which generally follows the shape of the flange. When installing the apparatus 10, the fasteners may be inserted through the cover, which is formed of a suitable material such as plastic or paper, and through the bores 24 in the elevation structures 26.

In addition to the functional qualities of the cover 70, it may also be utilized to contain writing or graphics 76 setting forth instructions for use of the apparatus, as well as advertisements. In one embodiment, the cover 70 might include a central perforation 78 thereon to facilitate peeling or removal of the cover from the flange 20 when it is desirable to couple a plumbing fixture with the flange. Central pull tabs 80 might be used to that end. Furthermore, score lines 74 in the tabs 72 may facilitate easier application and peeling of the cover 70.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A floor flange apparatus for use with a plumbing fixture positioned on a floor surface, the apparatus comprising:
   a conduit section having a fixture end and a drain end and defining a bore therethrough, the conduit section adapted to be coupled to a drain pipe proximate the drain end and to be coupled to a plumbing fixture proximate the fixture end for draining water from the plumbing fixture;
   a flange positioned proximate the fixture end of the conduit, the flange configured to engage a plumbing fixture and couple the fixture to the conduit section;
   at least one elevation structure extending from the flange, the elevation structure configured for interfacing with a floor surface to elevate the flange above the floor surface;
   at least a portion of the elevation structure being removably coupled with the flange for being selectively removed to allow the elevation of the flange to be selected.

2. The floor flange apparatus of claim 1 wherein said elevation structure comprises a plurality of sections, at least one of the sections being removable from the other of the sections for selectively varying the flange elevation.

3. The floor flange apparatus of claim 1 further comprising a plurality of elevation structures, the elevation structures positioned at spaced positions around the flange.

4. The floor flange apparatus of claim 1 wherein said elevation structure is in the form of an elongated leg.

5. The floor flange apparatus of claim 2 wherein said plurality of sections are separated by breakpoints for selectively breaking one section from the other to vary the elevation of the flange.

6. The floor flange apparatus of claim 5 wherein said sections are dimensioned at predetermined lengths for elevating the flange at predetermined levels above the floor surface.

7. The floor flange apparatus of claim 1 wherein the elevation structure is configured to elevate the flange above the floor surface approximately 1.5 inches.

8. The floor flange apparatus of claim 1 wherein the elevation structure is configured to elevate the flange above the floor surface approximately 0.75 inches.

9. The floor flange apparatus of claim 1 wherein said elevation structure includes a bore for allowing a fastener to extend through the elevation structure for fixing the flange to the floor surface.

10. The floor flange apparatus of claim 4 wherein said elongated leg extends generally perpendicular to a plane of the flange.

11. The floor flange apparatus of claim 1 wherein at least a portion of said elevation structure is integrally formed with the flange.

12. The floor flange apparatus of claim 1 wherein said elevation structure is further configured to be generally completely removed from the flange to allow the flange to be positioned generally on the floor surface.

13. The floor flange apparatus of claim 1 further comprising a removable cover extending over the fixture end of the conduit section to seal the conduit and prevent debris from falling therein, the cover operable for being removed when a fixture is coupled to the apparatus.

14. The floor flange apparatus of claim 13 wherein said flange includes slots therein for use in engaging a plumbing fixture, the cover having tabs thereon configured to cover the slots to prevent debris from entering the slots, the cover tabs operable for being removed when the fixture is coupled to the apparatus.

15. An apparatus for varying the height of a floor flange and attached conduit above a floor surface, the apparatus comprising:
    a base section configured for engaging a floor surface proximate the floor flange;
    at least one elevation structure extending above the base section, the elevation structure configured for interfacing with a floor flange to elevate the flange above the base section and floor surface;
    at least a portion of the elevation structure being removably coupled with the base section for being selectively removed to allow the elevation of the flange to be selected.

16. The apparatus of claim 15 wherein said elevation structure comprises a plurality of sections, at least one of the sections being removable from the other of the sections for selectively varying the flange elevation.

17. The apparatus of claim 15 further comprising a plurality of elevation structures, the elevation structures positioned at spaced positions around the flange.

18. The apparatus of claim 15 wherein said elevation structure is in the form of an elongated leg.

19. The apparatus of claim 16 wherein said plurality of sections are separated by breakpoints for selectively breaking one section from the other to vary the elevation of the flange.

20. The apparatus of claim 19 wherein said sections are dimensioned at predetermined lengths for elevating the flange at predetermined levels above the floor surface.

21. The apparatus of claim 15 wherein the elevation structure is configured to elevate the flange above the floor surface approximately 1.5 inches.

22. The apparatus of claim 15 wherein the elevation structure is configured to elevate the flange above the floor surface approximately 0.75 inches.

23. The apparatus of claim 15 wherein at least a portion of said elevation structure is integrally formed with the base section.

24. A method of mounting a plumbing fixture on a floor surface, the method comprising:
    positioning a drain end of a conduit section with a drain pipe in a floor;
    positioning, above the floor surface, a flange coupled to a fixture end of the conduit section;
    elevating the flange a distance above the floor surface using at least one elevation structure extending from the flange, the elevation structure configured for interfacing with the floor surface to thereby position the flange above the floor surface;
    selecting the level of elevation for the flange based on the length of the elevation structure;
    coupling a plumbing fixture with the flange to couple the fixture to a drain pipe.

25. The method of claim 24 further comprising selectively removing at least a portion of the elevation structure to selectively vary the elevation of the flange above the floor surface.

26. The method of claim 24 further comprising removing generally the entire elevation structure from the flange to allow the flange to be positioned generally on the floor surface.

27. The method of claim 24 wherein said elevation structure comprises a plurality of sections, and further comprising removing at least one of the sections for selectively varying flange elevation.

28. The method of claim 27 wherein said plurality of sections are separated by breakpoints and comprising selectively breaking one section from the other to vary the elevation of the flange.

29. The method of claim 28 wherein said sections are dimensioned at predetermined lengths for elevating the flange at predetermined levels above the floor surface.

30. The method of claim 24 wherein the elevation structure is configured to elevate the flange above the floor surface approximately 1.5 inches.

31. The method of claim 24 wherein the elevation structure is configured to elevate the flange above the floor surface approximately 0.75 inches.

32. The method of claim 24 wherein at least a portion of said elevation structure is integrally formed with the flange.

* * * * *